United States Patent
Koseoglu

(10) Patent No.: US 11,529,625 B2
(45) Date of Patent: Dec. 20, 2022

(54) METHOD OF PRODUCING AN ENCAPSULATED HYDROPROCESSING CATALYST

(71) Applicant: Saudi Arabian Oil Company, Dhahran (SA)

(72) Inventor: Omer Refa Koseoglu, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 46 days.

(21) Appl. No.: 17/165,393

(22) Filed: Feb. 2, 2021

(65) Prior Publication Data
US 2022/0241766 A1    Aug. 4, 2022

(51) Int. Cl.
| | | |
|---|---|---|
| B01J 29/06 | (2006.01) | |
| B01J 37/02 | (2006.01) | |
| B01J 29/16 | (2006.01) | |
| B01J 35/02 | (2006.01) | |
| B01J 37/04 | (2006.01) | |
| B01J 37/08 | (2006.01) | |

(52) U.S. Cl.
CPC ......... *B01J 37/0246* (2013.01); *B01J 29/166* (2013.01); *B01J 35/023* (2013.01); *B01J 37/04* (2013.01); *B01J 37/08* (2013.01); *B01J 2229/123* (2013.01)

(58) Field of Classification Search
CPC .. B01J 29/166; B01J 29/7815; B01J 29/7615; B01J 29/48; B01J 29/46; B01J 29/072; B01J 29/076; B01J 29/14; B01J 29/146; B01J 29/16; B01J 29/24; B01J 29/26; B01J 2229/123; B01J 35/023; B01J 35/0006; B01J 37/04; B01J 37/08; B01J 37/0009; B01J 37/0219; B01J 37/023; B01J 37/20; B01J 37/0203
USPC ....... 502/216, 219, 200, 220, 232, 240, 255, 502/256, 257, 260, 355, 350, 60, 62, 63, 502/64, 66, 69, 71, 78, 79
See application file for complete search history.

(56) References Cited

U.S. PATENT DOCUMENTS

| | | | |
|---|---|---|---|
| 3,770,617 A | 11/1973 | Riley et al. | |
| 3,948,763 A | 4/1976 | Christman et al. | |
| 4,725,569 A | 2/1988 | Tuszynski et al. | |
| 4,943,547 A | 7/1990 | Seamans et al. | |
| 5,851,378 A * | 12/1998 | Vogt ..................... | B01J 37/0215 502/313 |
| 6,417,134 B1 | 7/2002 | Dufresne et al. | |
| 7,235,173 B2 | 6/2007 | Diehl et al. | |
| 8,389,781 B2 | 3/2013 | Sandstede et al. | |
| 8,697,598 B2 | 4/2014 | Long | |
| 9,006,126 B2 | 4/2015 | Gillespie | |
| 9,156,029 B2 | 10/2015 | Gabrielov et al. | |
| 9,221,036 B2 | 12/2015 | Koseoglu et al. | |
| 9,579,642 B2 * | 2/2017 | Alphazan ............. | B01J 37/0205 |
| 9,586,199 B2 | 3/2017 | Gabrielov et al. | |
| 10,357,761 B2 | 7/2019 | Koseoglu et al. | |
| 10,399,070 B2 | 9/2019 | Carrette | |
| 10,787,618 B2 | 9/2020 | Koseoglu et al. | |
| 10,941,354 B1 | 3/2021 | Hodgkins et al. | |
| 2006/0231464 A1 | 10/2006 | Brignac et al. | |
| 2016/0001280 A1 * | 1/2016 | Gabrielov ............. | C10G 45/06 502/167 |

FOREIGN PATENT DOCUMENTS

| | | |
|---|---|---|
| CN | 109675570 A | 4/2019 |
| WO | 2011036862 A1 | 3/2011 |

OTHER PUBLICATIONS

International Search Report and Written Opinion dated Oct. 22, 2021 pertaining to International application No. PCT/US2021/020867 filed Mar. 4, 2021, 13 pages.

* cited by examiner

*Primary Examiner* — Elizabeth D Wood
(74) *Attorney, Agent, or Firm* — Dinsmore & Shohl LLP

(57) ABSTRACT

Embodiments of the present disclosure are directed to a method of producing an encapsulated hydroprocessing catalyst comprising: preparing a hydroprocessing catalyst comprising a porous support and at least one metal supported on the porous support, the porous support comprising alumina, silica, titania, or combinations thereof, and the at least one metal selected from IUPAC Groups 6, 9 and 10 metals; applying a catalyst activation precursor comprising a sulfur containing compound, a catalyst deactivation precursor comprising a nitrogen containing compound, or both onto pores of the hydroprocessing catalyst to form a loaded hydroprocessing catalyst; and coating the loaded hydroprocessing catalyst with a coating material to produce the encapsulated hydroprocessing catalyst, wherein the coating material comprises a polymer or a paraffinic oil.

19 Claims, 3 Drawing Sheets

METHOD OF PRODUCING AN ENCAPSULATED HYDROPROCESSING CATALYST

TECHNICAL FIELD

Embodiments of the present disclosure generally relate to methods of producing an encapsulated hydroprocessing catalyst.

BACKGROUND

Hydroprocessing catalysts are used in the removal of impurities from hydrocarbon feedstocks that are typically derived from the distillation of crude petroleum. Common impurities are sulfur compounds and nitrogen compounds. These impurities are catalytically converted into hydrogen sulfide and ammonia to then are subsequently removed from the hydrocarbon feedstocks.

Generally, hydroprocessing catalysts are composed of a support with a metal, such as molybdenum, tungsten, nickel, and cobalt, deposited thereon. The conventional methods for preparing these hydroprocessing catalysts are characterized in that a support composited with the metal components, for example by impregnation. These metal components are only active when they are in a sulfide form. Thus, the hydroprocessing catalysts generally are subjected to a sulfidation treatment.

Conventional sulfidation treatments are ex-situ and in-situ sulfidations. Ex-situ sulfidation processes take place outside a reactor in which the catalyst is to be used in hydroprocessing hydrocarbon feedstocks. In such a process, the catalyst is contacted with a sulfur compound (catalyst activation precursor) outside the reactor and the metal is converted into the metal sulfide. In-situ sulfidation processes take place in the reactor in which the catalyst is to be used in hydroprocessing hydrocarbon feeds. Here, the catalyst is contacted in the reactor at elevated temperature with a hydrogen gas stream mixed with a sulfiding agent (catalyst activation precursor), and the metal is converted into the metal sulfide. In these ex-situ and in-situ sulfidations, the catalyst activation precursor is required to activate the metal components in the catalyst.

SUMMARY

Accordingly, there is a continual need for hydroprocessing catalysts with improved catalytic activity while avoiding excess supply of catalyst activation precursor and catalyst deactivation precursor. Embodiments of the present disclosure meet this need by encapsulating a catalyst activation precursor, a catalyst deactivation precursor, or both onto pores of hydroprocessing catalysts through the coating layer. This eliminates or greatly reduces the need for bringing catalyst activation precursor and catalyst deactivation precursor into a refinery process.

According to one or more aspects of the present disclosure, a method of producing an encapsulated hydroprocessing catalyst may comprise preparing a hydroprocessing catalyst comprising a porous support and at least one metal supported on the porous support, the porous support comprising alumina, silica, titania, or combinations thereof, and the at least one metal selected from International Union of Pure and Applied Chemistry (IUPAC) Groups 6, 9 and 10 metals; applying a catalyst activation precursor comprising a sulfur containing compound, a catalyst deactivation precursor comprising a nitrogen containing compound, or both onto pores of the hydroprocessing catalyst to form a loaded hydroprocessing catalyst; and coating the loaded hydroprocessing catalyst with a coating material to produce the encapsulated hydroprocessing catalyst, wherein the coating material comprises a polymer or a paraffinic oil.

Additional features and advantages of the described embodiments will be set forth in the detailed description which follows, and in part will be readily apparent to those skilled in the art from that description or recognized by practicing the described embodiments, including the detailed description which follows and the claims.

BRIEF DESCRIPTION OF THE DRAWINGS

The following detailed description of specific embodiments of the present disclosure can be best understood when read in conjunction with the drawings enclosed herewith.

Figure 1:
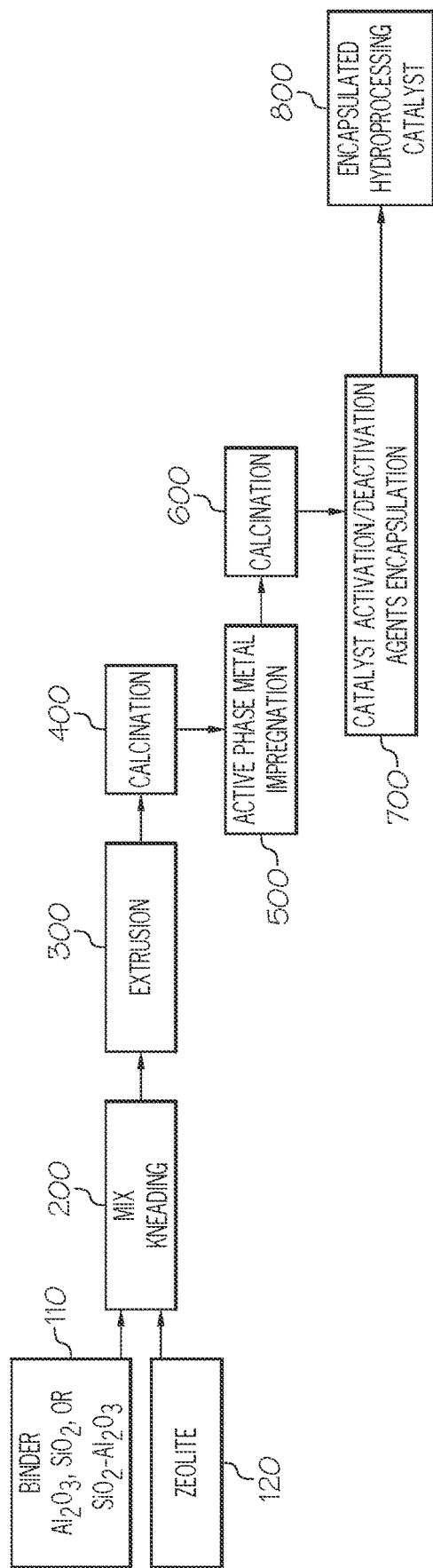
FIG. 1 schematically depicts a generalized flow diagram of a method for producing encapsulated hydroprocessing catalyst, according to one or more embodiments of the present disclosure.

Reference will now be made in detail to various embodiments, some embodiments of which are illustrated in the accompanying drawings.

DETAILED DESCRIPTION

As used in this disclosure, a "catalyst" refers to any substance which increases the rate of a specific chemical reaction. Catalysts described in this disclosure may be utilized to promote various reactions, such as, but not limited to, hydrocracking, hydrodemetalization, hydrodesulfurization, hydrodenitrogenation, hydrogenation, or combinations thereof. As used in this disclosure, "cracking" generally refers to a chemical reaction where a molecule having carbon-to-carbon bonds is broken into more than one molecule by the breaking of one or more of the carbon-to-carbon bonds, or is converted from a compound which includes a cyclic moiety, such as an aromatic, to a compound which does not include a cyclic moiety. "Hydrocracking" refers to the cracking of hydrocarbons in the presence of hydrogen.

As used in this disclosure, "catalytic activity" with respect to the hydroprocessing catalyst refers to the ability of the hydroprocessing catalyst to catalyze hydroprocessing reactions, such as hydrocracking reactions, hydrodemetalization reactions, hydrodesulfurization reactions, hydrodenitrogenation reactions, hydrogenations reactions, etc.

As used in this disclosure, a "loaded hydroprocessing catalyst" refers to a catalyst including the hydroprocessing catalyst and the catalyst activation agent, the catalyst deactivation agent, or both onto pores of the hydroprocessing catalyst.

As used in this disclosure, a "polymer" refers to a polymeric compound prepared by polymerizing monomers, whether of the same or a different type.

Coated Hydroprocessing Catalyst

Embodiments of the present disclosure are directed to coated hydroprocessing catalysts. The coated hydroprocessing catalyst of the present disclosure may include a hydroprocessing catalyst comprising a porous support and at least one metal supported on the porous support; wherein the porous support comprising alumina, silica, titania, or combinations thereof; and the at least one metal selected from International Union of Pure and Applied Chemistry (IUPAC) Groups 6, 9 and 10 metals; a catalyst activation agent, a catalyst deactivation agent, or both loaded onto pores of the porous support, the catalyst activation agent comprising at least one sulfur compound and the catalyst deactivation agent comprising at least one nitrogen compound; and a coating layer on a surface of the hydroprocessing catalyst, the coating layer encapsulating the catalyst activation agent, the catalyst deactivation agent, or both within the hydroprocessing catalyst, wherein the coating layer comprises polymer, paraffinic oil, or both. Without being bound by theory, encapsulating the hydroprocessing catalyst with a coating layer reduces the need for supplemental catalyst deactivation agent, because the coating layer slows the desorption or decomposition of the catalyst deactivation agent loaded on the porous support.

As stated previously, the coated hydroprocessing catalyst includes the hydroprocessing catalyst. The hydroprocessing catalyst may include the porous support and the at least one metal.

The porous support may include alumina ($Al_2O_3$), silica (SiO2), titania ($TiO_2$), zeolite, or combinations thereof. In one or more embodiments, the porous support may include a zeolite. As used herein, a "zeolite" refers to a microporous, crystallized aluminosilicate material. Zeolites of the present disclosure may have a FAU, MFI, MOR, or BEA type framework as defined by International Zeolite Association (IZA) Structure Commission In one or more embodiments, the porous support may include alumina ($Al_2O_3$), silica (SiO2), titania ($TiO_2$), or combinations thereof. The porous support may have a molar ratio of alumina to silica alumina-to-silica of from 5 to 1000, from 5 to 500, from 5 to 300, from 5 to 200, from 5 to 100, from 2 to 1000, from 2 to 500, from 2 to 300, from 2 to 200, from 2 to 100, from 1 to 1000, from 1 to 500, from 1 to 300, from 1 to 200, or from 1 to 100.

The porous support may have a pore volume of from 0.4 ml/g to 1.5 ml/g, from 0.4 ml/g to 1.25 ml/g, from 0.4 ml/g to 1.0 ml/g, from 0.4 ml/g to 0.75 ml/g, or from 0.4 ml/g to 0.5 ml/g. The pore volume of the porous support may be measured by Brunauer, Emmett, and Teller ("BET") method, which measures the quantity of nitrogen adsorbed on the support.

The porous support may have a surface area of up to 1000 square meters per gram ($m^2/g$), or from 100 $m^2/g$ to 1000 $m^2/g$, from 100 $m^2/g$ to 900 $m^2/g$, from 100 $m^2/g$ to 800 $m^2/g$, from 100 $m^2/g$ to 500 $m^2/g$, from 120 $m^2/g$ to 1000 $m^2/g$, from 120 $m^2/g$ to 900 $m^2/g$, from 120 $m^2/g$ to 800 $m^2/g$, from 120 $m^2/g$ to 500 $m^2/g$, from 150 $m^2/g$ to 1000 $m^2/g$, from 150 $m^2/g$ to 900 $m^2/g$, from 150 $m^2/g$ to 800 $m^2/g$, from 150 $m^2/g$ to 500 $m^2/g$, from 180 $m^2/g$ to 1000 $m^2/g$, from 180 $m^2/g$ to 900 $m^2/g$, from 180 $m^2/g$ to 800 $m^2/g$, from 180 $m^2/g$ to 500 $m^2/g$, from 200 $m^2/g$ to 1000 $m^2/g$, from 200 $m^2/g$ to 900 $m^2/g$, from 200 $m^2/g$ to 800 $m^2/g$, or from 200 $m^2/g$ to 500 $m^2/g$. The binder may have a surface area of from 100 $m^2/g$ to 200 $m^2/g$, from 100 $m^2/g$ to 150 $m^2/g$, or from 150 $m^2/g$ to 200 $m^2/g$.

The porous support may have an average pore size of from 10 Angstrom (Å) to 10,000 Å, from 10 Å to 9000 Å, from 10 Å to 8000 Å, from 10 Å to 5000 Å, from 50 Å to 10000 Å, from 50 Å to 9000 Å, from 50 Å to 8000 Å, from 50 Å to 5000 Å, from 100 Å to 10000 Å, from 100 Å to 9000 Å, from 100 Å to 8000 Å, from 100 Å to 5000 Å. The average pore sizes may be calculated by the equation $Ps=4V/S$, where $Ps$=pore size, $V$=pore volume, and $S$=surface area.

The porous support may be formed into the shape selected from the group of sphere, cylinder, trilobe, twisted trilobe, and quadra-lobes. Methods for shaping the porous support may include, for example, extrusion, spray drying, pelletizing, agglomeration, oil drop, and the like. As used herein, an "oil drop" process refers to precipitation that occurs upon the pouring of a liquid into an immiscible liquid.

As stated above, the at least one metal may be supported on the porous support. The at least one metal may include the IUPAC Groups 6, 9 and 10 metals. In some embodiments, the IUPAC Groups 6, 9 and 10 metals may include Co, Mo, Ni, W, or combinations thereof. In one embodiment, the at least one metal may be in oxide form, such as CoO, $MoO_3$, NiO, $WO_3$. In other embodiments, the at least one metal may be in sulfide form, such as $Co_9S_8$, $MoS_2$, $Ni_3S_2$, $WS_2$.

The hydroprocessing catalysts may be bi-functional catalysts, having both a cracking function and a hydrogenation function. The cracking function may be provided by cracking components, such as zeolite, alumina, silica, or titania. The hydrogenation function may be provided by the at least one metal including the IUPAC Groups 6, 9 and 10 metals. In some embodiments, the at least one metal may be added to the porous support by mixing or impregnation. For example, the IUPAC Groups 6, 9 and 10 metals may be introduced to the porous support by mixing, and may be converted to an oxide in-situ by calcination.

The hydroprocessing catalyst may be used as catalysts for hydroprocessing reactions. Example hydrocarbon feedstocks that may be processed by the hydroprocessing catalysts presently described include crude oil fractions such as naphtha, diesel, vacuum gas oil, vacuum residue or intermediate refinery streams such as deasphalted oil, coker naphtha, gas oils, and fluid catalytic cracking cycle oils. In hydroprocessing reactions, the major reactions may be sulfur, nitrogen, and metal removal. The hydroprocessing catalysts may have one or more of hydrodesulfurization (HDS), hydrodenitrogenation (HDN), or hydrodemetallization (HDM), hydrocracking (HCR), hydrogenation (HYD) functionality.

In one or more embodiments, the hydroprocessing catalyst may have an average cross-sectional dimension of from 0.01 millimeters (mm) to 5.0 mm, from 0.1 mm to 5.0 mm, from 0.5 mm to 5.0 mm, from 0.01 mm to 3.0 mm, from 0.1 mm to 3.0 mm, from 0.5 mm to 3.0 mm, from 0.01 mm to 2.5 mm, from 0.1 mm to 2.5 mm, from 0.5 mm to 2.5 mm, from 0.01 mm to 2.0 mm, from 0.1 mm to 2.0 mm, or from 0.5 mm to 2.0 mm. The cross-sectional dimension of the hydroprocessing catalyst may be measured using Transmission Electron Microscopy (TEM), dry sieving, or the laser light scattering technique.

As stated previously, the coated hydroprocessing catalyst includes the catalyst activation agent, a catalyst deactivation agent, or both. The catalyst activation agent, a catalyst deactivation agent, or both may be impregnated or absorbed into the pores of the porous support.

The catalyst activation agent may include a sulfur containing compound. In one embodiment, the catalyst activation agent may include organic sulfide, organic disulfide, organic polysulfide, elemental sulfur, or their oxidized forms. For example, the catalyst activation agent may include methanethiol, thiophene, dialkyl disulfide, diaryl disulfide, or combinations thereof. The catalyst activation agent may include dimethyl disulfide (DMDS). The catalyst activation agent may include disulfide oil from a Mercaptan Oxidation (Merox) unit. The disulfide oil from the Merox unit may have a general formula R S S R', wherein R and R' are alkyl groups with carbon number in the range 1 to 20. In some embodiments, the general formula may include DMDS.

The catalyst deactivation agent may include a nitrogen containing compound. In one embodiment, the catalyst deactivation agent may include an organic nitrogen compound. For example, the catalyst deactivation agent may include amine, carbazole, indoles, quinoline, amide, acridine, aniline, ammonia, or their oxidized forms. The catalyst deactivation agent may include methyldiethanolamine (MDEA).

The coated hydroprocessing catalyst may also include the coating layer. The coating layer may encapsulate the catalyst activation agent, the catalyst deactivation agent, or both within the hydroprocessing catalyst.

The coating layer may include polymer, paraffinic oil, or both. In one or more embodiments, the polymer may include a polymer material originates from olefins, carbonates, aromatics, sulfones, fluorinated hydrocarbons, chlorinated hydrocarbons, acrylonitrides, or combinations thereof. The polymer material may include polystyrene, polyethylene, polypropylene, or combinations thereof. In one or more embodiments, the paraffinic oil may include N-paraffinic wax with carbon number 20 to 50.

In one or more embodiments, the coating layer may have an average thickness from 50 μm to 100 μm, from 50 μm to 90 μm, from 50 μm to 80 μm, from 40 μm to 100 μm, from 40 μm to 90 μm, or from 40 μm to 80 μm.

In one or more embodiments, the coating layer may have a melting point of up to 350° C., from 20° C. to 350° C., from 30° C. to 350° C., from 40° C. to 350° C., from 50° C. to 350° C., from 100° C. to 350° C., from 20° C. to 300° C., from 30° C. to 300° C., from 40° C. to 300° C., from 50° C. to 300° C., from 100° C. to 300° C., from 20° C. to 250° C., from 30° C. to 250° C., from 40° C. to 250° C., from 50° C. to 250° C., or from 100° C. to 250° C.

In one or more embodiments, the coated hydroprocessing catalyst may have an average cross-sectional dimension of from 0.05 mm to 6.0 mm, from 0.06 mm to 6.0 mm, from 0.1 mm to 6.0 mm, from 0.5 mm to 6.0 mm, from 0.05 mm to 3.0 mm, from 0.06 mm to 3.0 mm, from 0.1 mm to 3.0 mm, or from 0.5 mm to 3.0 mm.

Methods of Producing Encapsulated Hydroprocessing Catalyst

Further embodiments of the present disclosure are directed to methods of the above-referenced encapsulated hydroprocessing catalyst (coated hydroprocessing catalyst). As described above, encapsulated hydroprocessing catalyst may be produced by coating the hydroprocessing catalyst to encapsulate the catalyst activation precursor, the catalyst deactivation precursor, or both onto the pores of the hydroprocessing catalyst. The encapsulated hydroprocessing catalysts produced by coating the hydroprocessing catalyst with the polymer or the paraffinic oil allows for preparation of hydroprocessing catalyst having improved catalytic activity without excess supply of the catalyst activation precursor, the catalyst deactivation precursor, or both. Without being bound by theory, encapsulating the hydroprocessing catalyst with a coating layer reduces the need for supplemental catalyst deactivation agent, because the coating layer slows the desorption or decomposition of the catalyst deactivation agent loaded on the porous support.

Figure 2:
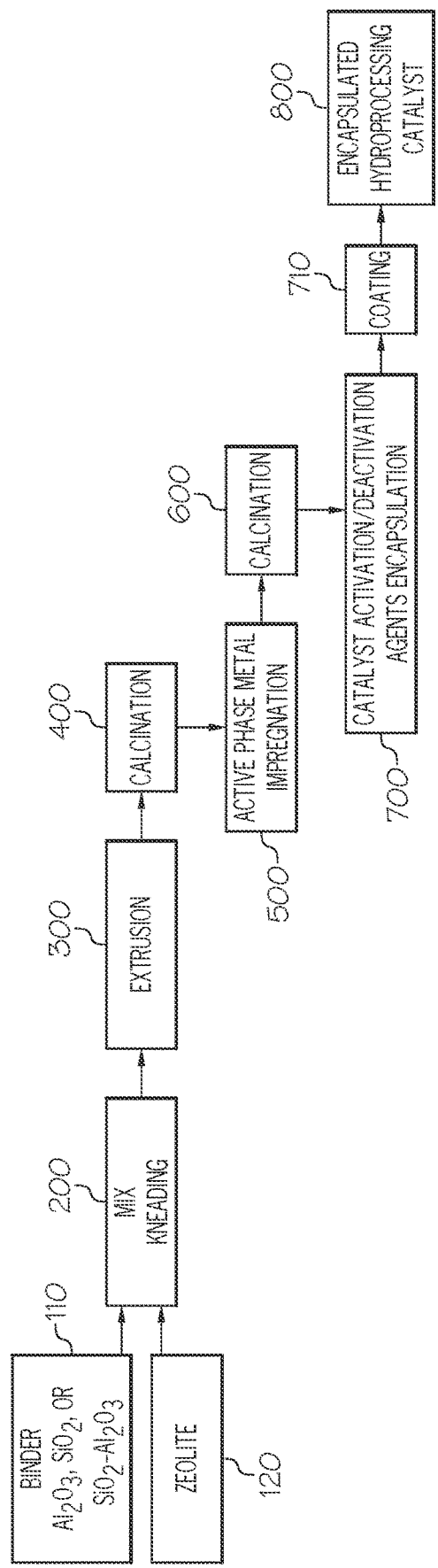
FIG. 2 schematically depicts a generalized flow diagram of another embodiment of a method for producing encapsulated hydroprocessing catalyst, according to one or more embodiments of the present disclosure.

The method may include preparing the hydroprocessing catalyst that includes the above described porous support and at least one metal supported on the porous support. Referring to FIGS. 1 and 2, the preparing step may include preparing the binder 110 and preparing at least one of alumina, silica, titania, or combinations thereof. The binder may be mixed with the at least one of alumina, silica, titania, or combinations thereof, to produce the blend. The binder may be capable of holding the hydroprocessing catalyst components together. Various binders are considered suitable. For example, the binder may include clay, mineral, alumina, silica, titania, or combinations thereof. The clay may include kaolin. The alumina may include one or more of attapulgite, boehmite, or partially acid-peptized alumina.

In some embodiments, prior to mixing at least one of alumina, silica, titania, or combinations thereof with the binder, the zeolite may be prepared 120 and mixed 200 with the blend including at least one of alumina, silica, titania, or combinations thereof and the binder. In alternative embodiments, the zeolite may be added with at least one of alumina, silica, titania, or combinations thereof.

Still referring to FIGS. 1 and 2, in some embodiments, the blend may be extruded 300 to produce the catalyst particle that includes zeolite, alumina, silica, titania, or combinations thereof. In other embodiments, the catalyst particle may be produced through spray drying, pelletizing, agglomeration, oil drop, or combinations thereof. In some embodiments, producing the catalyst particle may include producing the porous support. The porous support may be produced through precipitation, mulling, kneading 200, or combinations thereof. The mulled or kneaded support may be subjected to the thermal treatment at a temperature of from 10° C. to 50° C., from 10° C. to 40° C., from 20° C. to 50° C., or from 20° C. The at least one metal may be added to the porous support by mixing or impregnation to produce the catalyst particle. For example, the at least one metal may be introduced to the porous support by mixing, and may be converted to an oxide form in-situ by calcination. Alternatively, the at least one metal in oxide form may be introduced to the porous support by mixing to produce the catalyst particle.

The catalyst particle may be calcined 400 to produce the calcined catalyst particle. Calcination temperature may range from 500° C. to 650° C., or from 500° C. to 600° C. Calcination times may range from 0.5 hours to 6 hours, from 0.5 hours to 3 hours, from 1 hour to 6 hours, or from 1 hour to 3 hours. The calcination step 400 may be carried out in an oxygen containing atmosphere.

The calcined catalyst particle may be impregnated 500 with the at least one metal to produce the impregnated catalyst particle. The impregnation step 500 described in this disclosure is based on incipient wetness impregnation of the at least one metal. Other methods of impregnating 500 the calcined catalyst particle with the at least one metal, such as immersion impregnation, evaporative impregnation, may also be employed.

The calcined catalyst particle may be contacted with the solution that includes the at least one metal. As stated previously, the at least one metal may include the IUPAC Groups 6, 9 and 10 metals. In some embodiments, the IUPAC Groups 6, 9 and 10 metals may include Co, Mo, Ni, W, or combinations thereof. In one embodiment, the at least one metal may be in oxide form, such as $CoO$, $MoO_3$, $NiO$, $WO_3$. In other embodiment, the at least one metal may be in sulfide form, such as $Co_9S_8$, $MoS_2$, $Ni_3S_2$, $WS_2$.

The calcined catalyst particle may be contacted with the solution at ambient conditions. The solution may be mixed for a period of time prior to contacting the calcined catalyst particle with the solution. After contacting the calcined catalyst particle with the solution including the at least one metal, the excess liquids, such as solution or solvent, may be removed from the mixture to produce the impregnated catalyst particle. Removing the liquid components may include removing the excess solution from the impregnated catalyst particle and drying the impregnated catalyst particle. Removing the excess solution from the impregnated catalyst particle may include subjecting the mixture to decantation, filtration, vacuum filtration, or combinations thereof. In some embodiments, drying may be conducted at a temperature of from 50° C. to 200° C., from 50° C. to 180° C., from 50° C. to 150° C., from 100° C. to 200° C., from 100° C. to 180° C. or from 100° C. to 150° C. The drying period may be from 3 hours to 30 hours, from 3 hours to 20 hours, or from 3 hours to 10 hours.

In one or more embodiments, impregnating 500 the calcined catalyst particle may take place at a temperature of from 20° C. to 40° C., from 20° C. to 35° C., or from 20° C. to 30° C. In one or more embodiments, impregnating 500 the calcined catalyst particle may take place at pressure of from 0.5 bars to 3 bars, from 0.5 bars to 2.5 bars, from 1 bar to 3 bars, from 1.5 bar to 2.5 bars, from 1.5 bars to 3 bars, or from 1.5 bars to 2.5 bars.

The impregnated catalyst particle may be calcined 600 to produce the hydroprocessing catalyst. Calcination temperature may range from 500° C. to 700° C., from 500° C. to 650° C., or from 500° C. to 600° C. Calcination times may range from 0.5 hours to 6 hours, from 0.5 hours to 5 hours, from 0.5 hours to 3 hours, from 1 hour to 6 hours, from 1 hour to 5 hours, or from 1 hour to 3 hours. The calcination step 600 may be carried out in an oxygen containing atmosphere.

The method may further include applying the catalyst activation precursor, the catalyst deactivation precursor, or both onto pores of the hydroprocessing catalyst to form a loaded hydroprocessing catalyst. In some embodiments, the catalyst activation precursor, the catalyst deactivation precursor, or both may be loaded inside the pores of the porous support, on the surface of the porous support, or both. Once the catalyst activation precursor and the catalyst deactivation precursor is loaded inside the pores of the porous support, on the surface of the porous support, or both, the catalyst activation precursor and the catalyst deactivation precursor may constitute the catalyst activation agent and the catalyst deactivation agent, respectively.

The catalyst activation precursor, the catalyst deactivation precursor, or both may be applied for a period of time long enough to provide sufficient adsorption or deposition of the catalyst activation precursor, the catalyst deactivation precursor, or both inside the pores of the porous support, on the surface of the porous support, or both. In some embodiments, the catalyst activation precursor, the catalyst deactivation precursor, or both may be applied in gas phase, liquid phase, or gas-liquid phase.

Still referring to FIGS. 1 and 2, in one or more embodiments, the applying step may include impregnating 700 the catalyst activation precursor, the catalyst deactivation precursor, or both into the hydroprocessing catalyst to produce the loaded hydroprocessing catalyst. The applying steps described in this disclosure are based on incipient wetness impregnation of the catalyst activation precursor, the catalyst deactivation precursor, or both inside the pores of the porous support, on the surface of the porous support, or both. Other methods of impregnating 700 the catalyst activation precursor, the catalyst deactivation precursor, or both into the hydroprocessing catalyst, such as immersion impregnation, evaporative impregnation, may also be employed.

The impregnation step 700 may include contacting the hydroprocessing catalyst with the solution that includes the catalyst activation precursor, the catalyst deactivation precursor, or both. As stated previously, the catalyst activation precursor may include a sulfur containing compound. In one embodiment, the catalyst activation precursor may include organic sulfide, organic disulfide, organic polysulfide, elemental sulfur, or their oxidized forms. For example, the catalyst activation precursor may include methanethiol, thiophene, dialkyl disulfide, diaryl disulfide, or combinations thereof. The catalyst activation precursor may include dimethyl disulfide (DMDS). The catalyst activation precursor may include disulfide oil from a Merox unit. The disulfide oil from the Merox unit may have a general formula R S S R', wherein R and R' are alkyl groups with carbon number in the range 1 to 20. In some embodiments, the general formula may include DMDS. The catalyst deactivation precursor may include a nitrogen containing compound. In one embodiment, the catalyst deactivation precursor may include an organic nitrogen compound. For example, the catalyst deactivation precursor may include amine, carbazole, indoles, quinoline, amide, acridine, aniline, ammonia, or their oxidized forms. The catalyst deactivation precursor may include methyldiethanolamine (MDEA).

In one or more embodiments, the impregnation step 700 may take place at temperature of from 20 Celsius (° C.) to 80° C., from 20° C. to 75° C., from 20 to 70° C., from 25° C. to 80° C., from 25° C. to 75° C., from 25 to 70° C., from 30° C. to 80° C., from 30° C. to 75° C., or from 30° C. to 70° C. In one or more embodiments, the impregnation step 700 may take place at pressure of from 1 bar to 3 bars, from 1 bar to 2.5 bars, from 1 bar to 2 bars, from 1.5 bars to 3 bars, 1.5 bars to 2.5 bars, or from 1.5 bars to 2 bars.

The hydroprocessing catalyst may be contacted with the solution at ambient conditions. The solution may be mixed for a period of time prior to contacting the hydroprocessing catalyst with the solution. The mixture comprising the hydroprocessing catalyst dispersed in the solution may be mixed for a period of time long enough to provide sufficient adsorption or deposition of the catalyst activation precursor, the catalyst deactivation precursor, or both, inside the pores of the porous support, on the surface of the porous support, or both.

After contacting the hydroprocessing catalyst with the solution including the catalyst activation precursor, the catalyst deactivation precursor, or both, the excess liquids, such as solution or solvent, may be removed from the mixture to produce the loaded hydroprocessing catalyst. Removing the liquid components may include removing the excess solution from the loaded hydroprocessing catalyst and drying the loaded hydroprocessing catalyst. Removing the excess solution from the loaded hydroprocessing catalyst may include subjecting the mixture to decantation, filtration, vacuum filtration, or combinations thereof. In some embodiments, drying may be conducted at a temperature of from 50° C. to 200° C., from 50° C. to 180° C., from 100° C. to 200° C., or from 100° C. to 180° C. The drying period may be from 3 hours to 30 hours, from 3 hours to 20 hours, or from 3 hours to 10 hours.

In some embodiments, the applying step may include spraying the catalyst activation precursor, the catalyst deactivation precursor, or both over the hydroprocessing catalyst. For example, the catalyst activation precursor, the catalyst deactivation precursor, or both may be sprayed over the hydroprocessing catalyst in a conveyor belt. In one or more embodiments, the applying step may include pouring the catalyst activation precursor, the catalyst deactivation precursor, or both over the hydroprocessing catalyst. In one or more embodiments, the applying step may include immersing the hydroprocessing catalyst into the catalyst activation precursor, the catalyst deactivation precursor, or both. Immersed hydroprocessing catalyst may be drained. In one or more embodiments, the applying step may include soaking the hydroprocessing catalyst into the catalyst activation precursor, the catalyst deactivation precursor, or both. Soaked hydroprocessing catalyst may be drained.

In some embodiments, when the catalyst activation precursor is loaded inside the pores of the hydroprocessing catalyst, onto the surface of the hydroprocessing catalyst, or both, the at least one metal included in the hydroprocessing catalyst may be a sulfide to maximize hydrodesulfurization (HDS), hydrodenitrogenation (HDN), hydrocracking (HCR), hydrogenation (HYD) or hydrodemetallization (HDM) functionality. The sulfidation treatment may be carried out in-situ or ex-situ. In-situ sulfidation may be conducted by treating the at least one metal in oxide form with the catalyst activation precursor in the presence of hydrogen. The catalyst activation precursor may generate hydrogen sulfide, which converts the metal oxide to metal sulfide, such as $Co_9S_8$, $MoS_2$, $Ni_3S_2$, $WS_2$. In some embodiments, in-situ sulfidation may be carried out under a hydrogen pressure. In one or more embodiments, in-situ sulfidation may be carried out at a temperature of from 20° C. to 250° C., from 20° C. to 200° C., from 30° C. to 250° C., or from 30° C. to 200° C. In one or more embodiments, ex-situ sulfidation may be conducted by providing organic polysulfide as a catalyst activation precursor. Organic polysulfide may include are dialkyl-polysulfides with a formula R-Sn-R', wherein R and R' are alkyls containing a carbon number in the range of 1 to 20, and n is a number in range of 3 to 10. In some embodiments, organic polysulfide may include Di-tert-butyl polysulfide (TBPS 454). In other embodiments, the hydroprocessing catalyst may be impregnated with elemental sulfur at a temperature below the melting point of sulfur. At the conditions, sulfur may sublime and be substantially incorporated into the pores of the hydroprocessing catalyst. The sulfur impregnated catalyst may be contacted with a hydrocarbon solvent to pre-wet mixture and react with to convert metal oxides to metal sulfides.

In some embodiments, when the catalyst deactivation precursor is loaded inside the pores of the hydroprocessing catalyst, onto the surface of the hydroprocessing catalyst, or both, the catalyst deactivation precursor may moderate the activity of the hydroprocessing catalyst. In some embodiments, nitrogen may be injected into a reactor in the form of aqueous or anhydrous ammonia to moderate the activity of the hydroprocessing catalyst. In some embodiments, to minimize the hazards of high-pressure ammonia injection, such as leaking or spilling ammonia from a tank or pipe, the catalyst deactivation precursor may include methyldiethanolamine (MDEA). For example, when injected into the reactor at the temperature above 180° C. in the presence of hydrogen, amines may readily decompose to form ammonia needed to deactivate the hydroprocessing catalyst.

Referring to FIG. 2, the method further includes coating 710 the loaded hydroprocessing catalyst with a coating material to produce the encapsulated hydroprocessing catalyst 800. Coating 710 the loaded hydroprocessing catalyst with the coating material that includes the polymer or the paraffinic oil may produce the coating layer on the loaded hydroprocessing catalyst. As stated previously, the polymer may include a polymer material originating from olefins, carbonates, aromatics, sulfones, fluorinated hydrocarbons, chlorinated hydrocarbons, acrylonitrides, or combinations thereof. The polymer material may include polystyrene, polyethylene, polypropylene, or combinations thereof. The paraffinic oil may include N-paraffinic wax with carbon number 20 to 50.

Coating 710 the loaded hydroprocessing catalyst may be conducted through spraying the coating material onto the loaded hydroprocessing catalyst.

In some embodiments, the coating layer may fully surround the loaded hydroprocessing catalyst. The coating layer may fully surround the hydroprocessing catalyst, the catalyst activation precursor, the catalyst deactivation precursor, or combinations thereof.

In one or more embodiments, the coating layer may have an average thickness from 50 μm to 100 μm, from 50 μm to 90 μm, from 50 μm to 80 μm, from 40 μm to 100 μm, from 40 μm to 90 μm, or from 40 μm to 80 μm.

EXAMPLES

The following examples illustrate one or more additional features of the present disclosure. It should be understood that these examples are not intended to limit the scope of the disclosure or the appended claims in any manner.

Example 1

Hydroprocessing Catalyst

The hydroprocessing catalyst was prepared from 30 wt. % of zeolite and 70 wt. % of binder. USY zeolite having a FAU type framework was used as the zeolite and alumina was used as the binder. The zeolite and binder were mixed to form a support. The support was mixed with 4 wt. % nickel and 16 wt. % molybdenum based on the total amount of the support respectively. The mixture was extruded and dried at 130° C. for 20 hours, and then calcined at 600° C. for 1 hour to produce the hydroprocessing catalyst.

Example 2

DMDS Loaded Hydroprocessing Catalyst

The hydroprocessing catalyst was dried in an oven for 1 hour at 150° C. to remove any volatile matters. As a catalyst activation precursor, aliquots of Dimethyl disulfide (DMDS) was added to 2.5 grams (g) of the dried hydroprocessing catalyst. 1.6 g of DMDS was absorbed into the pores of the hydroprocessing catalyst to produce the loaded hydroprocessing catalyst.

Example 3

Figure 3:
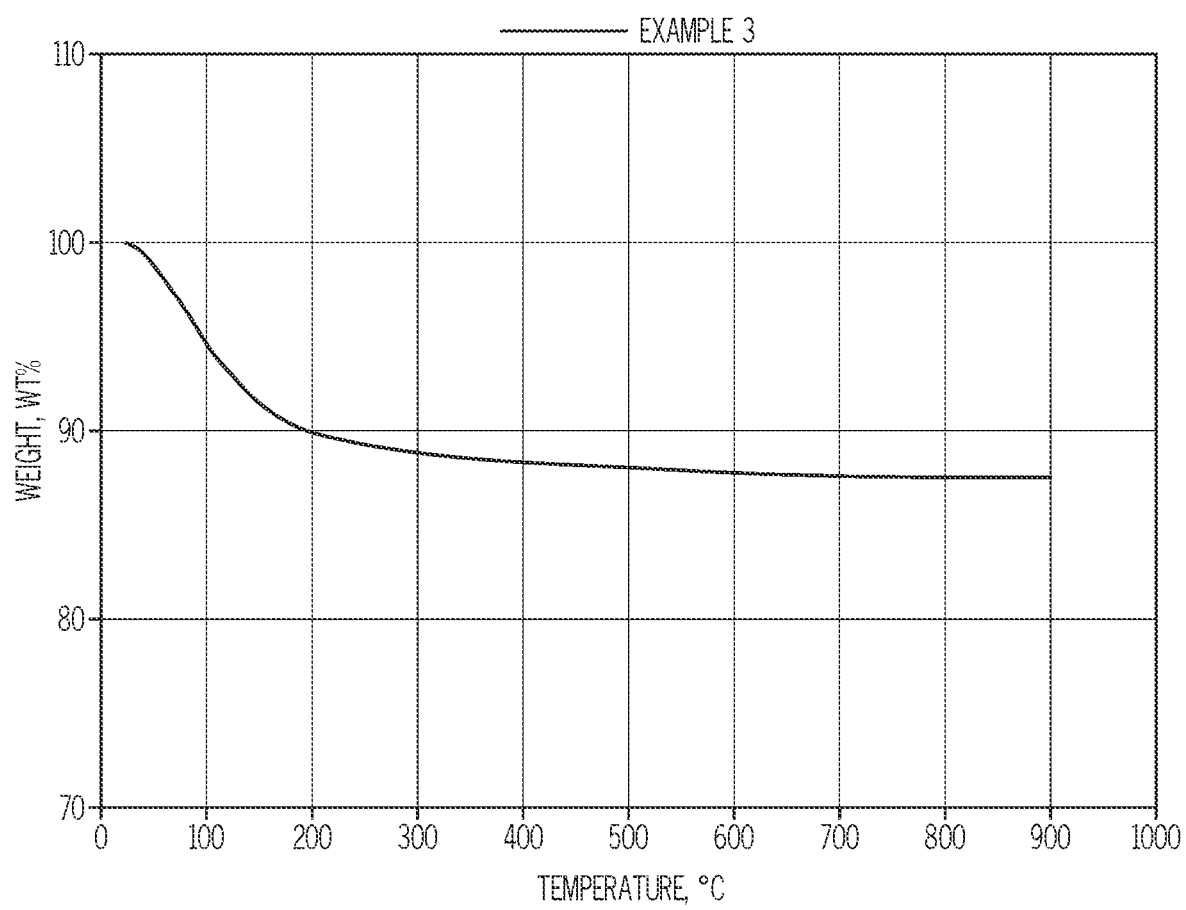
FIG. 3 is a thermogravimetric analysis (TGA) of Example 3.

TGA of DMDS Loaded Hydroprocessing Catalyst 10 mg of the loaded hydroprocessing catalyst was analyzed by Thermogravimetric analysis (TGA) under air flow. The TGA data were obtained on TA Instruments (Model number TGA Q500), 20° C./min heating rate over the range of from 25 to 900° C. As shown in FIG. 3, only 1 wt. % of DMDS based on the total amount of DMDS and hydroprocessing catalyst was released at 50° C., 5 wt. % was released at 100° C. and then 10 to 12 wt. % of DMDS was released from the loaded hydroprocessing catalyst at 300° C. The curve was flat after 300° C., indicating that all the DMDS was desorbed and/or decomposed under air flow.

Example 4

Encapsulated DMDS Loaded Hydroprocessing Catalyst (Coated Hydroprocessing Catalyst)

0.26 grams of n-paraffinic wax used to coat 4.1 grams the DMDS loaded hydroprocessing catalyst. The coating layer encapsulated the DMDS onto the pores of the loaded hydroprocessing catalyst.

Example 5

TBA Loaded Hydroprocessing Catalyst

The hydroprocessing catalyst was dried in an oven for 1 hour at 150° C. to remove any volatile matters. As a catalyst activation precursor, aliquots of t-butylamine (TBA) was added to 6.4 grams (g) of the dried hydroprocessing catalyst. 2.5 g of TBA was absorbed into the pores of the hydroprocessing catalyst to produce the loaded hydroprocessing catalyst.

Example 6

TGA of TBA Loaded Hydroprocessing Catalyst

Figure 4:
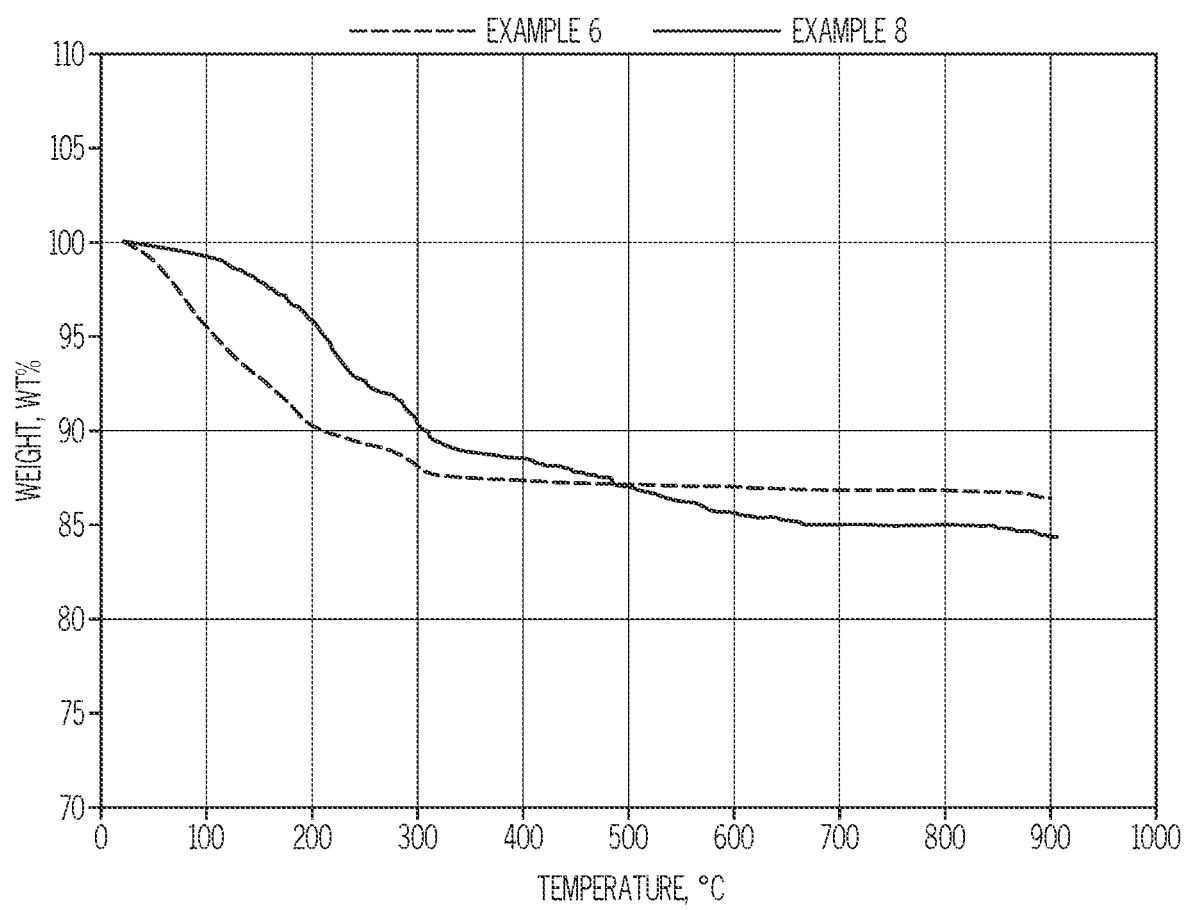
FIG. 4 is a TGAs of Example 6 and Example 8.

In Example 6, 40.35 mg of the loaded hydroprocessing catalyst of Example 5 was analyzed by TGA under air flow. The TGA data were obtained on TA Instruments (Model number TGA Q500), 20° C./min heating rate over the range of from 25 to 900° C. As shown in FIG. 4, only 0.94 wt. % of TBA based on the total amount of TBA and hydroprocessing catalyst was released at 50° C., 4.4 wt. % was released at 100° C. and then 13 to 14 wt. % of TBA was released from the loaded hydroprocessing catalyst at 310° C. The curve was flat after 310° C., indicating that all the TBA was desorbed and/or decomposed under air flow.

Example 7

Encapsulated TBA Loaded Hydroprocessing Catalyst (Coated Hydroprocessing Catalyst)

In Example 7, 0.8 g of n-paraffinic wax used to coat 15.9 g of TBA loaded hydroprocessing catalyst. The coating layer encapsulated the TBA onto the pores of the loaded hydroprocessing catalyst.

Example 8

TGA of Encapsulated Loaded Hydroprocessing Catalyst

In Example 8, 40.35 mg of the encapsulated hydroprocessing catalyst of Example 7 was analyzed by TGA under air flow. The TGA data were obtained on TA Instruments (Model number TGA Q500), 20° C./min heating rate over the range of from 25 to 900° C. As shown in FIG. 4, only 0.21 wt. % of TBA based on the total amount of TBA, hydroprocessing catalyst, and n-paraffin wax was released at 50° C., 0.81 wt. % was released at 100° C. and then 15.0 wt. % of TBA and paraffinic wax were released from the coated hydroprocessing catalyst at around 650° C. The curve was flat after 650° C., indicating that all the TBA and wax were desorbed and/or decomposed under air flow.

A first aspect of the present disclosure may be directed to a method of producing an encapsulated hydroprocessing catalyst, the method comprising preparing a hydroprocessing catalyst comprising a porous support and at least one metal supported on the porous support, the porous support comprising alumina, silica, titania, or combinations thereof, and the at least one metal selected from IUPAC Groups 6, 9 and 10 metals; applying a catalyst activation precursor comprising a sulfur containing compound, a catalyst deactivation precursor comprising a nitrogen containing compound, or both onto pores of the hydroprocessing catalyst to form a loaded hydroprocessing catalyst; and coating the loaded hydroprocessing catalyst with a coating material to produce the encapsulated hydroprocessing catalyst, wherein the coating material comprises a polymer or a paraffinic oil.

A second aspect of the present disclosure may include the first aspect, wherein the catalyst activation precursor, the catalyst deactivation precursor, or both are loaded inside the pores of the porous support, on a surface of the support, or both.

A third aspect of the present disclosure may include either one of the first or second aspects, wherein the applying step comprises: impregnating the catalyst activation precursor, the catalyst deactivation precursor, or both into the hydroprocessing catalyst; or adsorbing the catalyst activation precursor, the catalyst deactivation precursor, or both into the hydroprocessing catalyst.

A fourth aspect of the present disclosure may include any one of the first through third aspects, wherein the impregnating process comprises immersion impregnation, incipient wetness impregnation, or evaporative impregnation.

A fifth aspect of the present disclosure may include any one of the first through fourth aspects, wherein the applying step comprises: spraying the catalyst activation precursor, the catalyst deactivation precursor, or both over the hydroprocessing catalyst; pouring the catalyst activation precursor, the catalyst deactivation precursor, or both over the hydroprocessing catalyst; immersing the hydroprocessing catalyst into the catalyst activation precursor, the catalyst deactivation precursor, or both; or soaking the hydroprocessing catalyst into the catalyst activation precursor, the catalyst deactivation precursor, or both.

A sixth aspect of the present disclosure may include any one of the first through fifth aspects, wherein the catalyst activation precursor, the catalyst deactivation precursor, or both is loaded in gas phase, liquid phase, or gas-liquid phase.

A seventh aspect of the present disclosure may include any one of the first through sixth aspects, wherein the applying step takes place at a temperature of from 20° C. to 80° C.

An eighth aspect of the present disclosure may include any one of the first through seventh aspects, wherein the applying step takes place at a pressure of from 1 bar to 3 bars.

A ninth aspect of the present disclosure may include any one of the first through eighth aspects, wherein the preparing step comprises: mixing at least one of an alumina, a silica, or a titania with a binder to produce a blend; extruding the blend into a catalyst particle; calcining the catalyst particle to produce the calcined catalyst particle; impregnating the calcined catalyst particle with the at least one metal to produce an impregnated catalyst particle; and calcining the impregnated catalyst particle to produce the hydroprocessing catalyst.

A tenth aspect of the present disclosure may include any one of the first through ninth aspects, further comprising adding a zeolite to the blend prior to extruding the blend.

An eleventh aspect of the present disclosure may include any one of the first through tenth aspects, wherein the zeolite has a FAU, MFI, MOR, or BEA type framework.

A twelfth aspect of the present disclosure may include any one of the first through eleventh aspects, wherein the at least one metal is in oxide form or sulfide form.

A thirteenth aspect of the present disclosure may include any one of the first through twelfth aspects, wherein the IUPAC Groups 6, 9 and 10 metals comprise Co, Mo, Ni, W, or combinations thereof.

A fourteenth aspect of the present disclosure may include any one of the first through thirteenth aspects, wherein the hydroprocessing catalyst has an average cross-sectional dimension of from 0.01 mm to 5.0 mm.

A fifteenth aspect of the present disclosure may include any one of the first through fourteenth aspects, wherein the catalyst activation precursor comprises organic sulfide, organic disulfide, organic polysulfide, elemental sulfur, or their oxidized forms.

A sixteenth aspect of the present disclosure may include any one of the first through fifteenth aspects, wherein the catalyst activation precursor comprises methanethiol, thiophene, dialkyl disulfide, diaryl disulfide, or combinations thereof.

A seventeenth aspect of the present disclosure may include any one of the first through sixteenth aspects, wherein the catalyst activation precursor comprises dimethyl disulfide (DMDS).

An eighteenth aspect of the present disclosure may include any one of the first through seventeenth aspects, wherein the catalyst deactivation precursor comprises an organic nitrogen compound.

A nineteenth aspect of the present disclosure may include any one of the first through eighteenth aspects, wherein the catalyst deactivation precursor comprises amine, carbazole, indoles, quinoline, amide, acridine, aniline, ammonia, or their oxidized forms.

A twentieth aspect of the present disclosure may include any one of the first through nineteenth aspects, wherein the catalyst deactivation precursor comprises methyldiethanolamine (MDEA).

It is noted that one or more of the following claims utilize the term "wherein", "where" or "in which" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising." For the purposes of defining the present technology, the transitional phrase "consisting of" may be introduced in the claims as a closed preamble term limiting the scope of the claims to the recited components or steps and any naturally occurring impurities. For the purposes of defining the present technology, the transitional phrase "consisting essentially of" may be introduced in the claims to limit the scope of one or more claims to the recited elements, components, materials, or method steps as well as any non-recited elements, components, materials, or method steps that do not materially affect the novel characteristics of the claimed subject matter. The transitional phrases "consisting of" and "consisting essentially of" may be interpreted to be subsets of the open-ended transitional phrases, such as "comprising" and "including," such that any use of an open ended phrase to introduce a recitation of a series of elements, components, materials, or steps should be interpreted to also disclose recitation of the series of elements, components, materials, or steps using the closed terms "consisting of" and "consisting essentially of." For example, the recitation of a composition "comprising" components A, B, and C should be interpreted as also disclosing a composition "consisting of" components A, B, and C as well as a composition "consisting essentially of" components A, B, and C. Any quantitative value expressed in the present application may be considered to include open-ended embodiments consistent with the transitional phrases "comprising" or "including" as well as closed or partially closed embodiments consistent with the transitional phrases "consisting of" and "consisting essentially of."

As used in the Specification and appended Claims, the singular forms "a", "an", and "the" include plural references unless the context clearly indicates otherwise. The verb "comprises" and its conjugated forms should be interpreted as referring to elements, components or steps in a non-exclusive manner. The referenced elements, components or steps may be present, utilized or combined with other elements, components or steps not expressly referenced.

Further, when an amount, concentration, or other value or parameter is given as either a range, preferred range or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range. When a component is indicated as present in a range starting from 0, such component is an optional component (i.e., it may or may not be present). When present, an optional component may be at least 0.1 weight % of the composition or copolymer.

When materials, methods, or machinery are described herein with the term "known to those of skill in the art", "conventional" or a synonymous word or phrase, the term signifies that materials, methods, and machinery that are conventional at the time of filing the present application are encompassed by this description.

It should be understood that any two quantitative values assigned to a property may constitute a range of that property, and all combinations of ranges formed from all stated quantitative values of a given property are contemplated in this disclosure. The subject matter of the present disclosure has been described in detail and by reference to specific embodiments. It should be understood that any detailed description of a component or feature of one or more embodiments does not necessarily imply that the component or feature is essential to the particular embodiment or to any other embodiment. Further, it should be apparent to those skilled in the art that various modifications and variations can be made to the described embodiments without departing from the spirit and scope of the claimed subject matter.

What is claimed is:

1. A method of producing an encapsulated hydroprocessing catalyst comprises:

preparing a hydroprocessing catalyst comprising a porous support and at least one metal supported on the porous support, the porous support comprising alumina, silica, titania, or combinations thereof, and the at least one metal selected from International Union of Pure and Applied Chemistry (IUPAC) Groups 6, 9 and 10 metals, wherein the porous support further comprises a zeolite having a FAU, MFI, MOR, or BEA type framework;

applying a catalyst activation precursor comprising a sulfur containing compound, a catalyst deactivation precursor comprising a nitrogen containing compound, or both onto pores of the hydroprocessing catalyst to form a loaded hydroprocessing catalyst; and coating the loaded hydroprocessing catalyst with a coating material to produce the encapsulated hydroprocessing catalyst, wherein the coating material comprises a polymer or a paraffinic oil.

2. The method of claim 1, wherein the catalyst activation precursor, the catalyst deactivation precursor, or both are loaded inside the pores of the porous support, on a surface of the support, or both.

3. The method of claim 1, wherein the applying step comprises: impregnating the catalyst activation precursor, the catalyst deactivation precursor, or both into the hydroprocessing catalyst; or adsorbing the catalyst activation precursor, the catalyst deactivation precursor, or both into the hydroprocessing catalyst.

4. The method of claim 3, wherein the impregnating process comprises immersion impregnation, incipient wetness impregnation, or evaporative impregnation.

5. The method of claim 1, wherein the applying step comprises: spraying the catalyst activation precursor, the catalyst deactivation precursor, or both over the hydroprocessing catalyst; pouring the catalyst activation precursor, the catalyst deactivation precursor, or both over the hydroprocessing catalyst; immersing the hydroprocessing catalyst into the catalyst activation precursor, the catalyst deactivation precursor, or both; or soaking the hydroprocessing catalyst into the catalyst activation precursor, the catalyst deactivation precursor, or both.

6. The method of claim 1, wherein the catalyst activation precursor, the catalyst deactivation precursor, or both is loaded in a gas phase, liquid phase, or gas-liquid phase.

7. The method of claim 1, wherein the applying step takes place at a temperature of from 20 Celsius (° C.) to 80° C.

8. The method of claim 1, wherein the applying step takes place at a pressure of from 1 bar to 3 bars.

9. The method of claim 1, wherein the preparing step comprises:
mixing at least one of an alumina, a silica, or a titania with a binder to produce a blend;
extruding the blend into a catalyst particle;
calcining the catalyst particle to produce the calcined catalyst particle;
impregnating the calcined catalyst particle with the at least one metal to produce an impregnated catalyst particle; and
calcining the impregnated catalyst particle to produce the hydroprocessing catalyst.

10. The method of claim 9, further comprising adding the zeolite to the blend prior to extruding the blend.

11. The method of claim 1, wherein the at least one metal is in oxide form or sulfide form.

12. The method of claim 1, wherein the IUPAC Groups 6, 9 and 10 metals comprise Co, Mo, Ni, W, or combinations thereof.

13. The method of claim 1, wherein the hydroprocessing catalyst has an average cross-sectional dimension of from 0.01 millimeters (mm) to 5.0 mm.

14. The method of claim 1, wherein the catalyst activation precursor comprises organic sulfide, organic disulfide, organic polysulfide, elemental sulfur, or their oxidized forms.

15. The method of claim 1, wherein the catalyst activation precursor comprises methanethiol, thiophene, dialkyl disulfide, diaryl disulfide, or combinations thereof.

16. The method of claim 1, wherein the catalyst activation precursor comprises dimethyl disulfide (DMDS).

17. The method of claim 1, wherein the catalyst deactivation precursor comprises an organic nitrogen compound.

18. The method of claim 1, wherein the catalyst deactivation precursor comprises amine, carbazole, indoles, quinoline, amide, acridine, aniline, ammonia, or their oxidized forms.

19. The method of claim 1, wherein the catalyst deactivation precursor comprises methyldiethanolamine (MDEA).

* * * * *